(12) United States Patent
Raju A et al.

(10) Patent No.: US 12,495,090 B2
(45) Date of Patent: Dec. 9, 2025

(54) BANDWIDTH MANAGEMENT FOR A CLUSTER OF STORAGE NODES

(71) Applicant: Rubrik, Inc., Palo Alto, CA (US)

(72) Inventors: Yuva Raju A, Bangalore (IN); Nikhil Verma, Bangalore (IN); Ankit Mahendrakumar Nanglia, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 164 days.

(21) Appl. No.: 18/119,245

(22) Filed: Mar. 8, 2023

(65) Prior Publication Data

US 2024/0305688 A1    Sep. 12, 2024

(51) Int. Cl.
*H04L 67/1095* (2022.01)
*H04L 41/0896* (2022.01)
*H04L 47/17* (2022.01)

(52) U.S. Cl.
CPC ...... *H04L 67/1095* (2013.01); *H04L 41/0896* (2013.01); *H04L 47/17* (2013.01)

(58) Field of Classification Search
CPC .. H04L 67/1095; H04L 41/0896; H04L 47/17
See application file for complete search history.

(56) References Cited

U.S. PATENT DOCUMENTS 11,347,550 B1 * 5/2022 Harjono ............... G06F 9/5077
11,971,902 B1 * 4/2024 Warfield ............... G06F 16/27

* cited by examiner

*Primary Examiner* — Emmanuel L Moise
*Assistant Examiner* — Xiang Yu
(74) *Attorney, Agent, or Firm* — Holland & Hart LLP

(57) ABSTRACT

Methods, systems, and devices for data management are described. A first computing node within a first set of computing nodes may receive, from a network gateway, a first replication request that is associated with a first replication job for the first cluster of computing nodes to provide copies of a first set of one or more computing snapshots to a second cluster of computing nodes. The first set of computing nodes may determine that a second computing node different from the first computing node will service the data replication request. A network bandwidth allocation may be increased for the first computing node that received the replication request directly from the network gateway while the network bandwidth allocation for the second computing node is maintained for the second computing node based on the second computing node receiving the request via an internal redirection of the request.

20 Claims, 9 Drawing Sheets

BANDWIDTH MANAGEMENT FOR A CLUSTER OF STORAGE NODES

FIELD OF TECHNOLOGY

The present disclosure relates generally to data management, including techniques for bandwidth management for a cluster of storage nodes.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
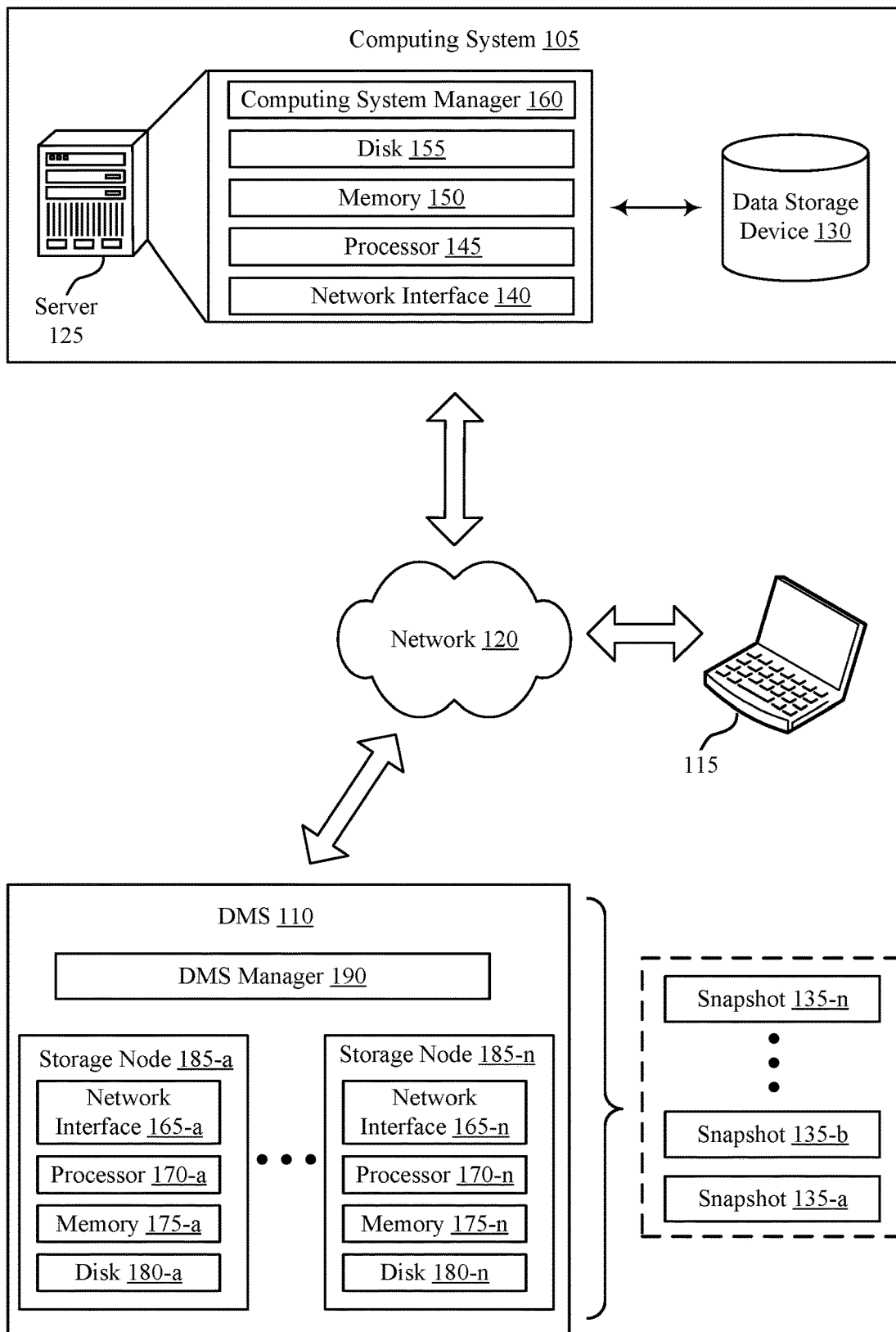
FIG. 1 illustrates an example of a computing environment that supports bandwidth management for a cluster of storage nodes in accordance with aspects of the present disclosure.

Network throttling may be used to help regulate the amount of bandwidth consumed by outgoing traffic from a cluster of nodes (e.g., servers or storage nodes). For example, data replication (e.g., copies of snapshots) from one cluster (a source cluster, which may alternative be referred to as a server cluster) to another cluster (a target cluster, which may alternative be referred to as a client cluster) may consume large amounts of bandwidth, and network throttling may be applied to such traffic on a cluster-wide basis in order to maintain available bandwidth for a network that includes the source cluster, the target cluster, or both (e.g., the total replication traffic for a cluster may be subject to a cluster-wide limit).

In some cases, data replication requests may be communicated from a target cluster to a source cluster via a network gateway (e.g., a network address translation (NAT) gateway), which may be in communication with both clusters. The network gateway may receive data replication requests from the target cluster and forward those requests to one or more nodes of the source cluster. A data replication request from the target cluster may be addressed to a specific port of the network gateway, and the network gateway may forward the request to the particular node of the source cluster that is mapped to that port of the network gateway. However, the node-to-port mapping at the network gateway (e.g., which nodes of the source cluster are mapped to which port of the network gateway) may be unknown to the source cluster. Further, in some cases only some of the nodes of the source cluster may be mapped to ports of the network gateway, with some nodes of the source cluster being unmapped directly to the NAT gateway. Such challenges such as unknown node-to-port mapping, the presence of unmapped nodes, or both, may complicate the allocation of bandwidth to individual nodes of the source cluster in a way that avoids exceeding the cluster-wide bandwidth limit while also avoiding under-utilization of the cluster-wide bandwidth limit and overloading of any individual node.

As described herein, a network may implement various different techniques for allocating replication requests and associated network bandwidth to individual nodes of a source cluster when replication requests are forwarded to the source cluster from a network gateway. For example, a portion of the available network bandwidth for the cluster may be allocated to nodes that are mapped directly to the gateway, while bandwidth allocation is not provided for nodes servicing requests that are not directly mapped to the NAT gateway. For example, if an individual node if the node receives a replication request directly from the network gateway (which means that the node is mapped to the network gateway), it may receive bandwidth allocation. In some other cases, the individual node may receive a request for replication to occur on a different node. In such cases, the individual node may forward the request to the requested node, but the requested node (which is not directly mapped to the NAT gateway) may not receive a network bandwidth allocation. The respective number of replication requests being handled by the individual nodes may also be tracked to inform the destination of redirected requests and avoid overloading any individual nodes while efficiently distributing the network bandwidth across mapped nodes.

FIG. 1 illustrates an example of a computing environment 100 that supports bandwidth management for a cluster of storage nodes in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 (e.g., network interface 165-a, network interface 165-n) may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 (such as a processor 170-a or a processor 170-n) may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 (e.g., memory 175-a, memory 175-n) and disks 180 (e.g., disk 180-a, disk 180-n) may comprise hardware storage devices. Collectively, the storage nodes 185 (e.g., storage node 185-a, storage node 185-n) may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 such as a snapshot 135-a, a snapshot 135-b, a snapshot 135-n, may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

Network throttling may be used to help regulate the amount of bandwidth consumed by outgoing traffic from a cluster of nodes (e.g., servers or storage nodes such as storage node 185-a and storage node 185-n). For example, data replication (e.g., copies of snapshots) from one cluster (a source cluster, which may alternative be referred to as a server cluster) to another cluster (a target cluster, which may alternative be referred to as a client cluster) may consume large amounts of bandwidth, and network throttling may be applied to such traffic on a cluster-wide basis in order to maintain available bandwidth for a network that includes the source cluster, the target cluster, or both (e.g., the total replication traffic for a cluster may be subject to a cluster-wide limit). Network throttling may in some cases be applicable to some types of traffic but not other types. For example, network throttling may be applied to data replication traffic that is outgoing from a cluster of nodes but may be inapplicable to intra-cluster traffic (e.g., traffic between nodes of the same cluster may not be throttled).

In some cases, data replication requests may be communicated from a target cluster to a source cluster via a NAT gateway located at the DMS 110, which may be in communication with both clusters. The network gateway may receive data replication requests from the target cluster and forward those requests to one or more nodes of the source cluster. A data replication request from the target cluster may be addressed to a specific port of the network gateway, and the network gateway may forward the request to the particular node of the source cluster that is mapped to that port of the network gateway. Such challenges such as unknown node-to-port mapping, the presence of unmapped nodes, or both, however, may complicate the allocation of bandwidth to individual nodes of the source cluster in a way that avoids exceeding the cluster-wide bandwidth limit while also avoiding under-utilization of the cluster-wide bandwidth limit and overloading of any individual node.

A network 120 may implement various different techniques for allocating replication requests and associated network bandwidth to individual nodes of a source cluster when replication requests are forwarded to the source cluster from a network gateway. For example, a portion of the available network bandwidth for the cluster may be allocated to nodes that are mapped directly to the NAT gateway, while bandwidth allocation is not provided for nodes servicing requests that are not directly mapped to the NAT gateway. For example, if an individual node receives a replication request directly from the network gateway (which means that the node is mapped to the network gateway), it may receive an additional amount of bandwidth allocation based on that replication request. In some other cases, the individual node may receive a request for replication to occur on a different node. In such cases, the individual node may forward the request to the requested node, but the requested node (which is not directly mapped to the NAT gateway) may not receive any additional amount of network bandwidth allocation based on that request.

Figure 2:
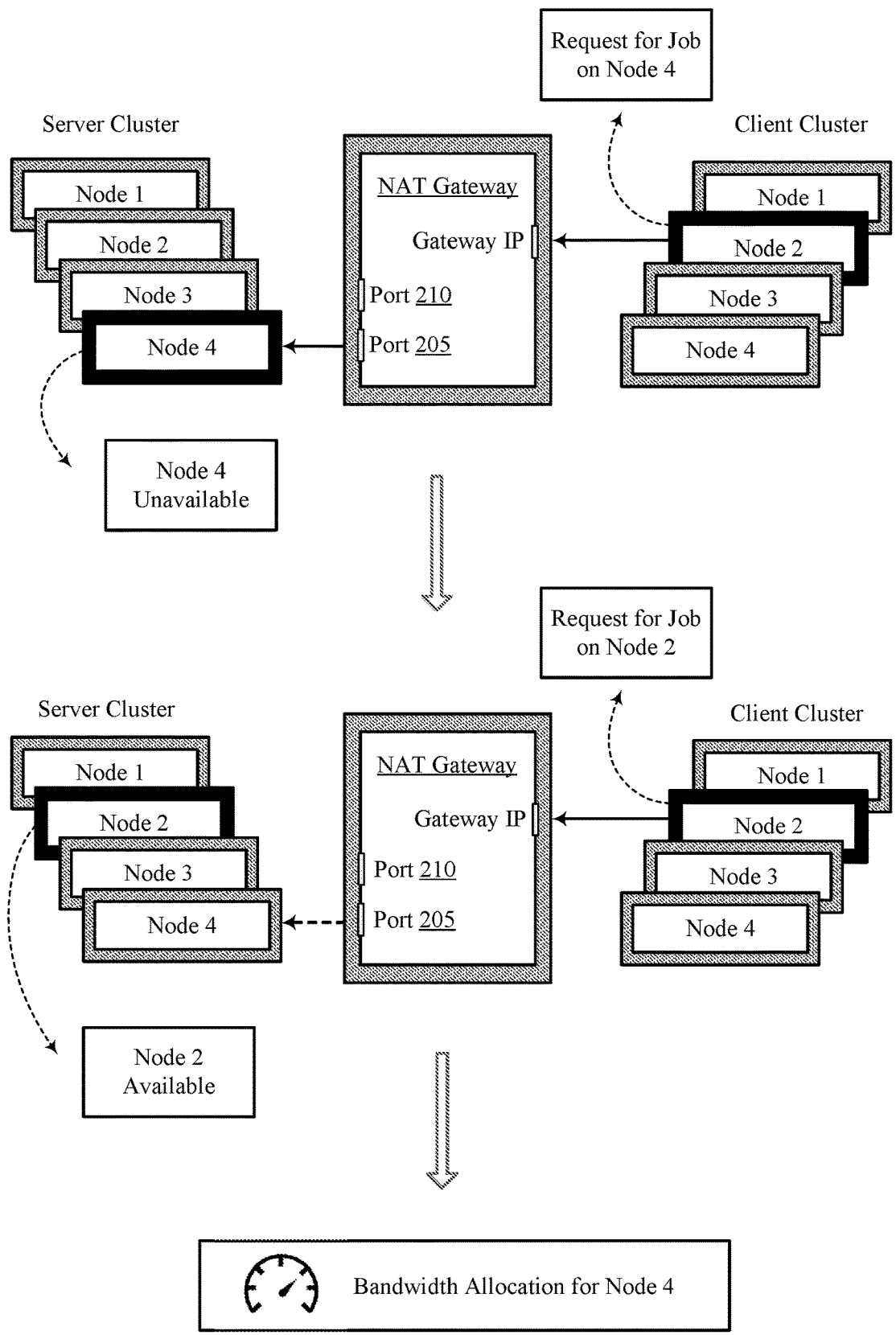
FIGS. 2 and 3 illustrate examples of resource registration and data transfer procedures that support bandwidth management for a cluster of storage nodes in accordance with aspects of the present disclosure.

FIG. 2 illustrates an example of a resource registration and data transfer procedure 200 that supports bandwidth management for a cluster of storage nodes in accordance with aspects of the present disclosure. For example, resource registration and data transfer procedure 200 may support data replication performed between different computing nodes located in a network of computing clusters.

Network throttling may be used to help regulate the amount of bandwidth consumed by outgoing traffic from a cluster of nodes (e.g., servers or storage nodes). For example, data replication (e.g., snapshot data) from one cluster (a source cluster or a server cluster) to another (a target cluster or a client cluster) may consume large amounts of bandwidth, and network throttling may be applied to such traffic on a cluster-wide basis in order to maintain available bandwidth for a network that includes the server cluster, the client cluster, or both, In such cases, the total replication traffic for a cluster may be subject to a cluster-wide limit. Some network throttle limits may limit outgoing traffic from a cluster using traffic control functionality (which may be, for example, a Linux utility for traffic control). Traffic limitation at cluster level is achieved by applying traffic control rules on each node of a cluster, where the sum of the bandwidth allocated to all the nodes is equal to the specified network bandwidth.

In some cases, data replication requests may be communicated from a client cluster to a server cluster. The server cluster may be responsible for taking backup snapshots of the data snappables based on an assigned service level agreement (SLA), and the client cluster may initiate a data pull request to replicate the snapshots to the client cluster. In some cases, however, this procedure may involve transferring relatively large amounts of data, which consumes overall network bandwidth and reduces bandwidth associated with other services connected or functioning within the network. Thus, to regulate the bandwidth utilization of the cluster, a system may enable replication network throttling, which may define the maximum or a threshold amount of bandwidth available for outgoing traffic related to replication requests, and may limit the number of replication requests serviced by an individual node to be less than or equal to a threshold number of replication requests. To minimize the overall impact on replication performance when network throttling is enabled, the replication requests may be distributed across the nodes of the cluster, and associated with additional traffic control rules, which may allow each node to saturate the available network bandwidth.

In some cases, data replication requests may be communicated from a client cluster to a server cluster via a network gateway (e.g., a network address translation (NAT) gateway), which may be in communication with both clusters (e.g., the client cluster and the server cluster). In some cases, a cluster of nodes or servers may serve a relatively large number of replication requests, and may transfer correspondingly large quantities of data from the cluster of nodes to a different cluster of nodes. In some examples, the cluster of nodes may have data centers spanned over multiple locations where any network request from the client cluster may be transferred via NAT gateway to nodes or servers in the server cluster. In such environments, some of the servers from the server cluster are mapped to the ports on the NAT gateway. The client cluster may then use an IP address of the NAT gateway and one of the multiple ports on the gateway to request data from the server cluster. In such cases, the port of the NAT gateway that the replication request reaches may determine the server or node at the server cluster that may serve the request.

The NAT gateway may receive data replication requests from the client or client cluster and forward those requests to one or more nodes of the server cluster. A data replication request from the client cluster may be addressed to a specific port of the network gateway, and the network gateway may forward the request to the particular node of the server cluster that is mapped to that port of the network gateway. For example, node 3 and node 4 may be mapped to the NAT gateway, and a request sent from the client cluster via the gateway IP may forward the request to node 3 or node 4.

In some examples, however, the node-to-port mapping at the network gateway (e.g., which nodes of the server cluster are mapped to which port of the network gateway) may be unknown or abstract to the server cluster. Further, in some cases, only some of the nodes of the server cluster may be mapped to ports of the network gateway, with some nodes of the server cluster unmapped. The unknown node-to-port mapping, the presence of unmapped nodes, or both, may complicate the allocation of bandwidth to individual nodes of the server cluster in a way that avoids exceeding the cluster-wide bandwidth limit while also avoiding under-utilization of the cluster-wide bandwidth limit and overloading of any individual node. As only some of the servers from the cluster are accessible via the NAT gateway, a system may apply the network throttle limit on each node to saturate the network bandwidth to the specified value.

In some examples, the network bandwidth may be distributed among the servers or nodes, including the nodes that are not mapped to the NAT gateway (e.g., nodes of the server cluster that are inaccessible directly via the NAT gateway). In such examples, only a fraction of total bandwidth may be allocated to the redirecting servers (e.g., servers mapped directly to the NAT gateway). As only some of the servers from the server cluster are mapped directly to the NAT gateway, the total egress traffic limit for the cluster may be equal to the sum of the bandwidth allocated to the redirecting servers rather than the total network bandwidth specified.

To increase system efficiency and to allow for the entire network bandwidth to be utilized, a system may support techniques to allocate bandwidth based on incoming replication requests to individual nodes of a server cluster when replication requests are forwarded to the server cluster from the NAT gateway. For example, the techniques described herein may reduce overloading requests on servers by limiting the number of requests processed by each node. Additionally or alternatively, the network bandwidth may be throttled at the server cluster to increase the overall utilization of the specified network bandwidth, while supporting changes in the node-to-port mapping on the NAT gateway (e.g., addition or deletion of mapping) that have limited impact the overall saturation of the network bandwidth. The techniques described herein may also be applied independent of the size of the cluster and also independent of the quantity of servers mapped directly on the NAT gateway.

To efficiently allocate the available network bandwidth for replication jobs, bandwidth may be allocated to nodes or an individual node if the node receives a replication request directly from the network gateway (e.g., a node that is mapped to the network gateway), but not if the node receives a redirected replication request from another node of the cluster. For example, a node that is not mapped to the network gateway may not receive a network bandwidth allocation, but instead the node from which the redirected request was received will receive a network bandwidth allocation and may relay the replication data from the node to the network gateway. In such examples, if a replication request is allocated for a first node that is unmapped to the NAT gateway, the replication job may be redirected internally to the first node from a second mapped node. Then, the second node (the mapped node) may receive the bandwidth allocation for receiving and redirecting the replication request and the first node would not. The respective number of replication requests being handled by the individual nodes may also be tracked to inform the destination of redirected requests and avoid overloading any individual node.

To support multiple data transfer requests and data transfer requests that include the transfer of relatively large quantities of data, the system may implement a multi-step data transfer that includes both a resource registration portion and a data transfer portion. During the resource registration portion, the client cluster may identify or claim resources on a server or node on the server cluster to use to process the data transfer requests. Then during the data transfer portion, the client uses the same server or node claimed during the resource registration to process the request for data transfer. In some examples, the record of resource registry may be maintained on the client cluster in a distributed database or file system.

In some examples, the client and server clusters may support a resource registration phase to select and identify nodes of the client cluster that may service data replication jobs. For example, during a resource registration phase, the client cluster may send a request for a data replication job from node 2 of the client cluster to node 4 of the server cluster. The request may be sent from the client cluster via the gateway IP on the NAT gateway, and may be allocated to port 205 mapped to node 4 of the server cluster (or may be allocated to another mapped node such as port 210 corresponding to node 3). In this example, however, node 4 may be busy performing other replication jobs or may be otherwise unavailable for the job requested by node 2. The server cluster may then send an indication to the client cluster that node 4 is unavailable to service the request from node 2. In response, node 2 may select a different node of the server cluster to service the data replication request. For example, node 2 may select node 2 for performing the data replication request at the server cluster. In such examples, node 2 may send a request via the gateway IP of the NAT gateway to a mapped node of the server cluster. For example, the request may be routed through node 4, node 3, or any other node of the server cluster mapped to the NAT gateway. If node 2 is available for servicing the data replication request, an indication acknowledging the data replication request may be sent to the client cluster to notify the availability of node 2. The client cluster may then begin data transfer. In such cases, network bandwidth may be allocated for node 4, which internally redirects the data for replication on node 2.

In some implementations, distribution of the data replication request in silo (e.g., without network throttling) may be performed by uniform randomization. For example, for server-side distribution, the server or node mapped to the port of the data replication request may redirect the request to any other server in the cluster based on unbiased randomization with equal probability. For example, nodes 3 and 4 of the server cluster (which are mapped to the NAT gateway) may redirect a data replication job request to nodes 1 or 2 of the server cluster. Additionally or alternatively, the mapped nodes may process the data replication request by itself (e.g., based on availability) based on unbiased randomization with equal probability. The server or node that processes the request (e.g., the worker node) may accept or reject the request based on how many requests are currently being performed by the worker node, based on network traffic, or based on other factors.

In such network throttling implementations in silo (e.g., without resource throttling and request distribution) may be performed by allocating a fraction of the total amount of network bandwidth for the server cluster to the redirecting node in the proportion of requests it serves out of the total requests (e.g., the total requests to the server currently being processed). Additionally or alternatively, in a dynamic system, multiple requests can acquire and release the resources over a period of time. The fractional bandwidth allocations then may be continuously revised to saturate available bandwidth.

With the node-to-port gateway mapping information being abstract, the system may limit resource utilization on each server or node and may dynamically apply the network throttle only on selected servers. For example, the server or node which receives the request directly from the NAT gateway (e.g., node 4) may be eligible for bandwidth allocation, where nodes that service redirected requests may not receive additional network bandwidth allocation. This process of bandwidth allocation may allow network bandwidth to be allocated for redirecting nodes or mapped nodes (e.g., nodes performing the redirecting) and is in proportion to the requests it serves out of the total requests currently processed. In such examples, the throughput may be independent of the number of servers mapped on the gateway, and the identification of redirecting nodes and the allocation of network bandwidth for nodes in a cluster may be dynamic and is independent of any change in node-to-port mapping on the gateway.

Figure 3:
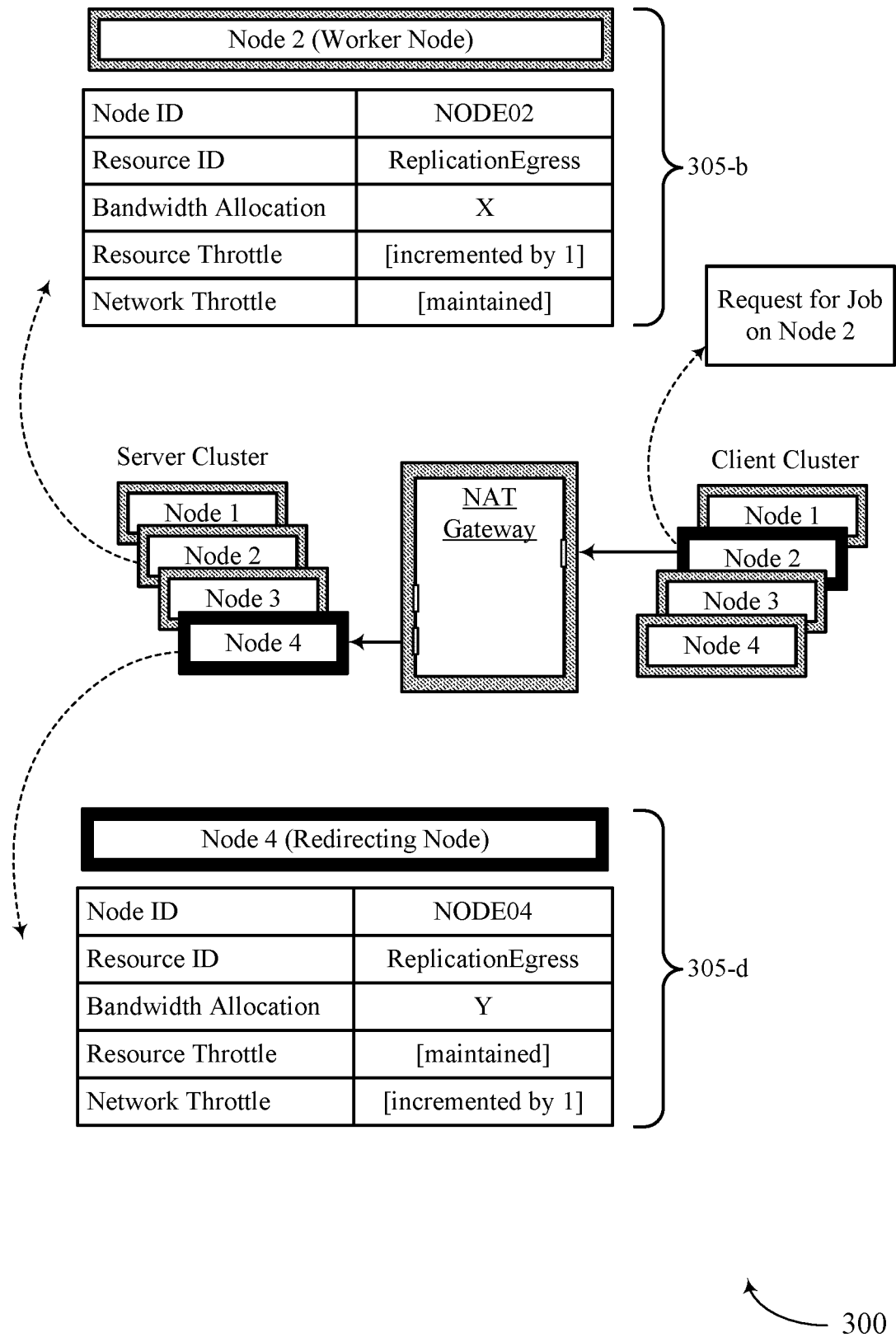

FIG. 3 illustrates an example of a resource registration and data transfer procedure 300 that supports bandwidth management for a cluster of storage nodes in accordance with aspects of the present disclosure. For example, resource registration and data transfer procedure 300 may support data replication performed between different computing nodes located in a network of computing clusters.

A system may efficiently handle data replication requests by separating data transfer between client and server nodes into a resource registration phase and a data transfer phase. For example, during a resource registration phase, the client cluster may select and identify nodes of the server cluster that may service data replication jobs. For example, during a resource registration phase, node 2 of the client cluster may select a node of the server cluster to service a data replication request. For example, node 2 of the client cluster may select node 4 of the server cluster for performing the data replication request at the server cluster. In such examples, node 2 of the client cluster may send a request via the gateway IP of the NAT gateway, which may be forwarded by the gateway to a mapped node of the server cluster, such as node 4 of the server cluster. If node 4 of the server cluster is available for servicing the data replication request, an indication acknowledging the data replication request may be sent to the client cluster to notify the availability of node 4. If node 4 of the server cluster has resources available for performing the data replication request, then node 4 may receive an allocation of network bandwidth to perform the data transfer and replication request. For example, a network throttle value, a resource throttle value, or both, may increase for node 4 at the server cluster to perform the resource registration and data transfer In some other examples, node 4 of the server cluster may be busy performing other jobs or may otherwise not have resources to service the request of node 2 of the client cluster. In such cases, resource throttle values may be checked for nodes in the resource registry and may be forwarded to a node with available resources. For example, a value of a resource throttle field associated with each node of the server cluster may be checked to determine if resources are available.

In cases that the first requested node of the server cluster is busy, the client cluster may request that a different node of the server cluster service the resource replication request. For example, node 2 of the client cluster may request node 2 from the server cluster to service the data replication job. In such examples, node 2 of the client cluster may send a request via a mapping of the NAT gateway to a mapped node of the server cluster. In some examples, the request may be routed through node 4 of the server cluster (or any other node of the server cluster mapped to the NAT gateway). If node 2 of the server cluster is available for servicing the data replication request, an indication acknowledging the data replication request may be sent to the client cluster to notify the availability of node 2. In some examples, the node that serves the data replication request (e.g., node 2 of the server cluster) may be referred to as a "worker node" and the node that is mapped directly to the gateway which redirects the request (e.g., node 4 of the server cluster) may be referred to as a "redirecting node."

The system may maintain (e.g., at the client cluster, at the server cluster, or both), a set of network throttle tables 305. For example, the system may maintain a respective network throttle table 305 for each cluster within the server cluster (e.g., a first network throttle table 305-$a$ for node 1, a second network throttle table 305-$b$ for node 2, a third network throttle table 305-$c$ for node 3, a fourth network throttle table 305-$d$ for node 4, and so on). While four nodes are shown in both the client cluster and server cluster in the example illustrated in FIG. 3, it is to be understood that the clusters may include any quantity of nodes (e.g., hundreds or thousands of nodes), and that aspects of the example in FIG. 3 may be simplified for the sake of illustrative clarity.

The network throttle table 305 for a node may indicate a Node ID corresponding to (e.g., that identifies) the node. The network throttle table 305 for a node may further indicate a Resource ID that corresponds to (e.g., that indicates) an applicability of one or more other aspects of the network throttle table 305 (e.g., that the network throttle table 305 is applicable to ReplicationEgress, which may be replication-related traffic that is outgoing from the cluster). The network throttle table 305 for a node may further indicate a current resource throttle value for the node, a current network throttle value for the node, or both. The network throttle table 305 for a node may further indicate a current network bandwidth allocation (e.g., an allocation of network bandwidth applicable to ReplicationEgress), which may be based on the network throttle value for the node, as explained herein.

The resource throttle value for the node may be reflective of (e.g., based on, indicative of) a quantity of active (e.g., pending) replication jobs being serviced or to be serviced (e.g., handled) by the node. For example, the resource throttle value for a node may be incremented (e.g., increased by 1) for each replication job that is newly assigned to or accepted by the node, and the resource throttle value for a node may be decremented (e.g., decreased by 1) for each replication job that is completed by the node. Further, in some cases, the resource throttle value for a node may be maintained (e.g., not changed or otherwise impacted) by replication requests that are received by the node (e.g., from the NAT gateway) but will be serviced by other nodes of the client cluster. In some examples, the network bandwidth allocation for the node may be independent of (e.g., not based on or influenced by) the resource throttle value for the node. Whether a node is available to service an additional (e.g., newly received) replication request may depend on whether the resource throttle value for the node is less than or equal to a threshold (e.g., if the resource throttle value for the node is less than or equal to the threshold, the node may be available, and if the resource throttle value for the node is greater than the threshold, the node may be unavailable).

The network throttle value for the node may be reflective of (e.g., based on, indicative of) a quantity of currently active (e.g., pending) replication requests received by the node from an external source, such as the NAT gateway, and for which the node will ultimately transmit (e.g., relay) responsive content (e.g., replication data) externally, such as to the NAT gateway. For example, the network throttle value for a node may be incremented (e.g., increased by 1) for each replication request that is newly received by the node from an external source (e.g., the NAT gateway), regardless of whether the request will be serviced by the node or by another node. The network throttle value for a node may be decremented (e.g., decreased by 1) upon completion of a transfer session associated with a replication request that was received by the node from the eternal source. Further, in some cases, the network throttle value for a node may be maintained (e.g., not changed or otherwise impacted) by replication requests that are received by the node as an internal redirect from another node of the client cluster (e.g., that were initially received at the client cluster from the other node) and will be serviced by the node.

The network bandwidth allocation for the node may be based on the network throttle value for the node. For example, the client cluster as a whole may have a total (e.g., cluster-wide) network bandwidth limit for Replication-Egress traffic (e.g., a total bandwidth allocation for the client cluster as a whole related to outgoing replication data). In some cases, each node of the cluster may also have a minimum network bandwidth allocation (e.g., even if the network throttle value for a node is 0), the node may still be allocated some minimum—e.g., lowest allowable—amount of network bandwidth). Thus, the client cluster may have a cluster-wide minimum amount of network bandwidth (e.g., equal to a product of the per-node minimum network bandwidth allocation and the quantity of nodes within the cluster). The client cluster may have an amount of network bandwidth headroom equal to a difference between the total network bandwidth limit for the client cluster and the cluster-wide minimum amount of network bandwidth. In examples in which there is no per-node minimum network bandwidth allocation (e.g., the per-node minimum network bandwidth allocation is 0), then the amount of network bandwidth headroom for the client cluster is equal to the total network bandwidth limit for the client cluster.

The network bandwidth headroom for the server cluster may be distributed (e.g., allocated) across the nodes of the server cluster based on the respective network throttle values for the nodes. For example, dividing the network bandwidth headroom for the server cluster by the quantity of nodes within the cluster may yield an incremental bandwidth factor, and the operative (e.g., current) network bandwidth allocation for a node may be equal to a product of the incremental bandwidth factor multiplied by the network throttle value for the node.

In an example in which the data replication request is routed through node 4 to node 2 on the server cluster, the resource throttle and network throttle values in a network throttle table associated with nodes 4 and 2 of the server cluster may be correspondingly updated. For example, the network throttle table 305-*d* associated with node 4 may be updated to reflect an updated allocation of network bandwidth for forwarding or redirecting the request to node 2. In addition, the network throttle table 305-*b* associated with node 2 may indicate that node 2 has resources available to serve the request (e.g., based on being a value less than or equal to a threshold), and may thus the data replication job may be assigned to node 2. Once the data replication job has been assigned to a node, the Node ID of the node to which the data replication job has been assigned (and the node that will service the data replication request) may be sent back to the client cluster.

The client cluster may then begin data transfer during a data transfer stage after successful resource registration. The client cluster initiates the data transfer phase, where the contents of the Node ID field of the network throttle table may be populated as metadata in the request sent to the server cluster. The server cluster may then check the metadata included in the request to determine the node where the resource is registered. The request is then redirected to the registered server or node which further serves the data to the client cluster.

In some examples, the number of requests served on each node is subject to a threshold number of requests based on resource throttle values for the nodes, as described herein. The number of requests is checked as part of resource registration, and if the node is already serving the maximum number of requests allowed per node, any further resource registration requests will be rejected. In some examples, network throttle values for each node may be enforced by adding traffic control rules on each node with corresponding allocated network throttle values. In such cases, the traffic control values may not limit or reduce intra-cluster traffic (e.g., from job redirects from a mapped node to a working node), or additional traffic control rules may be added with higher priority which bypass restrictions on intra-cluster traffic. The network bandwidth allocation for each node may be allocated by a background job run on the cluster. For example, a background job may fetch the network throttle value for each node populated in the resource registry based on the number of requests that are redirected and served directly from a node. The bandwidth is distributed proportional to the network throttle value for each node (e.g., as reflected in their corresponding network throttle tables 305), as described herein.

Figure 4:
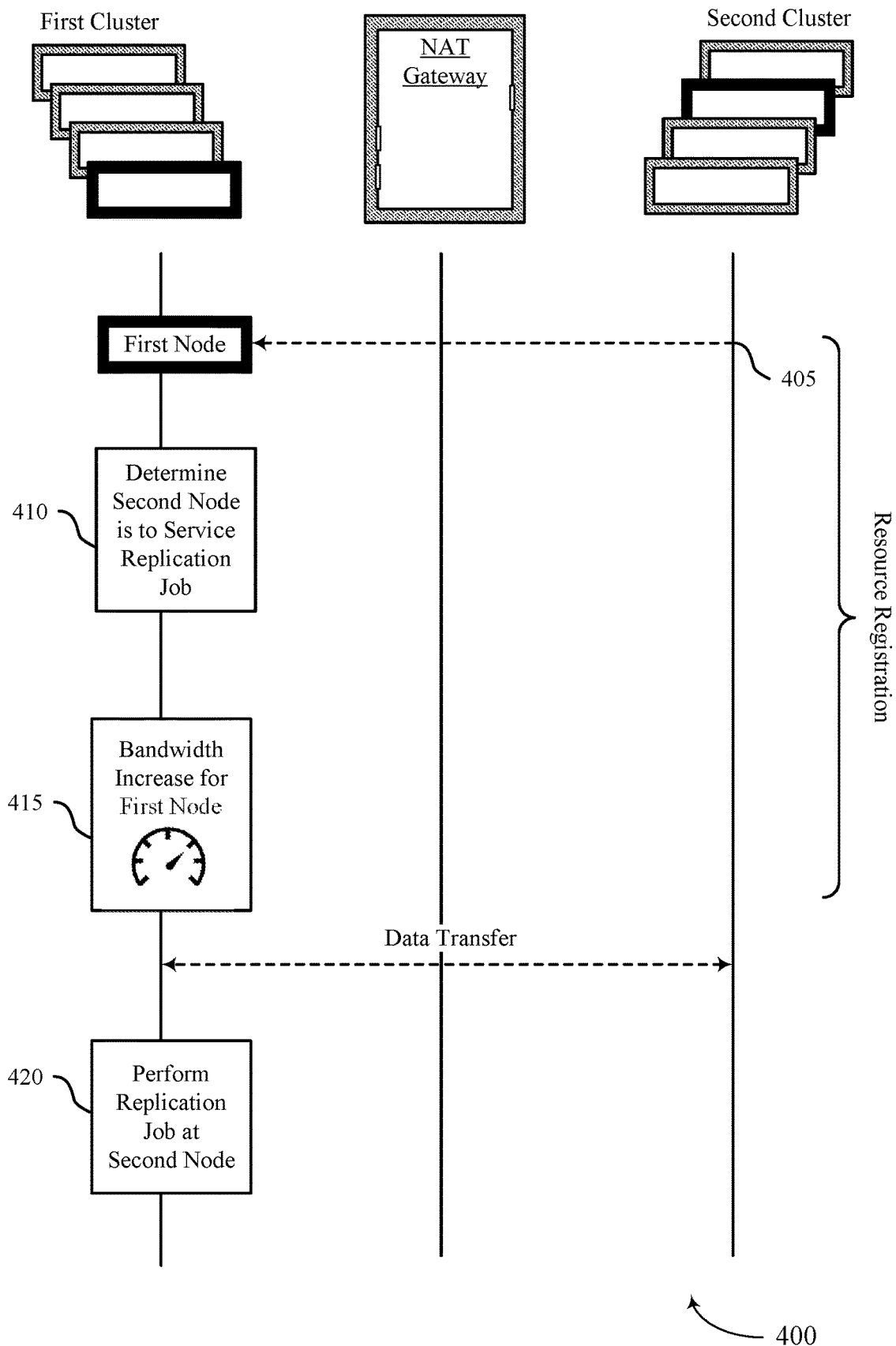
FIG. 4 illustrates an example of a process flow that supports bandwidth management for a cluster of storage nodes in accordance with aspects of the present disclosure.

FIG. 4 illustrates an example of a process flow 400 that supports bandwidth management for a cluster of storage nodes in accordance with aspects of the present disclosure. In the following description of process flow 400, the operations may be performed in a different order than the order shown, or other operations may be added or removed from the process flow 400. For example, some operations may also be left out of process flow 400, may be performed in different orders or at different times, or other operations may be added to process flow 400. Some aspects of some operations of process flow 400 may be performed at or by one or more computing nodes.

At 405, a first computing node of the first cluster of computing nodes (e.g., a server cluster) may receive a first replication request from a network gateway (e.g., the NAT gateway). The first replication request may be received during a resource registration phase, and may be associated with a first replication job for the first cluster of computing nodes to provide copies of a first set of one or more computing snapshots to a second cluster of computing nodes (e.g., a client cluster). In some examples, the first replication request may be received as part of a resource registration procedure to determine which node of the first cluster of computing nodes is to service the first replication job.

At 410, the first cluster of nodes may determine that a second computing node of the first cluster of computing nodes is to service the first replication job associated with the first replication request that was received at the first computing node.

At 415, the network bandwidth may be increased for the first computing node based on the first replication request being received at the first computing node from the network gateway (e.g., the network throttle value for the first computing node may be increased). In such examples, the network bandwidth allocation for the second computing node may be maintained (e.g., held constant, not changed, not increased) in response to the determination that the second computing node is to service the first replication job based on the first replication request having been received at the first computing node. For example, if a replication request is received at a source cluster by a first node and redirected to a second node, then the first node's bandwidth allocation may be increased while the second node's bandwidth allocation is maintained (e.g., not increased). Thus, replication requests that are handled (e.g., serviced) by a node due to an internal redirect of a request received at a different node from the gateway may not cause a corresponding increase in the handling node's bandwidth allocation, while, conversely, replication requests that are received at a node from the gateway may cause a corresponding increase in the receiving node's bandwidth allocation even if the replication request will be handled (e.g., serviced) by a different node.

In some examples, network throttle values for computing nodes of the first cluster of computing nodes may be increased in response to replication requests received at the computing node from the network gateway. In some other examples, the respective network throttle value for the computing node is decreased in response to completion of transfer sessions associated with the replication requests received at the computing node from the network gateway. In some other examples, the respective network throttle value for the computing node is maintained in response to replication jobs that are serviced by the computing node but are associated with replication requests received from the network gateway at other computing nodes of the first cluster of computing nodes. In such examples, the network bandwidth allocation for the computing node is proportional to the respective network throttle value for the computing node. In some examples, the network bandwidth allocation may be based on a background job associated with the first cluster of computing nodes.

In some implementations, resource throttle values for the computing nodes of the first cluster of computing nodes (that are based at least in part on respective quantities of pending replication jobs for service by the computing nodes) may be stored by the first cluster of computing nodes. The respective resource throttle value for a computing node may be increased in response to replication jobs to be serviced by the computing node, may be decreased in response to the computing node completing a replication job associated with a replication request, may be maintained in response to replication requests that are received at the computing node from the network gateway but are associated with replication jobs serviced by other computing nodes of the first cluster of computing nodes. In such examples, a network bandwidth allocation for the computing node may be independent of the respective resource throttle value for the computing node.

In some examples, the second computing node may receive a second replication request from the network gateway, the second replication request associated with a second replication job for the first cluster of computing nodes to provide copies of a second set of one or more computing snapshots to the second cluster of computing nodes. The second node may then receive an increase in a network bandwidth allocation for the second computing node based on the second replication request being received at the second computing node from the network gateway. In some examples, the second computing node may receive the first replication job based on a quantity of pending replication requests for service at the second computing node being below a threshold. The second computing node may be determined to service the data replication request based on a quantity of active replication jobs for the second computing node being less than a threshold quantity of replication jobs.

In some examples, the network bandwidth allocation for the first computing node and the network bandwidth allocation for the second computing node are applicable to traffic from the first computing node to the network gateway and from the second computing node to the network gateway respectively, and the network bandwidth allocation for the first computing node and the network bandwidth allocation for the second computing node are inapplicable to traffic between nodes of the first cluster of computing nodes.

In some examples, the first replication request identifies the second computing node, and the determination that the second computing node is available to service the first replication job is performed in response to the first replication request identifying the second computing node. The first computing node may then transmit (via the network gateway) an indication that the second computing node is available to service the first replication job. In some examples, the second computing node may be available to service the first replication job based on a random selection of the second computing node, where the second computing node and other nodes of the first cluster of computing nodes are equally likely to be selected via the random selection.

In some other examples, the first cluster of nodes may transmit (e.g., to the second cluster of computing nodes via the network gateway) an indication that the second computing node is to service the first replication job. The first cluster of nodes may then receive, after transmitting the indication that the second computing node is to service the first replication job, a transfer initiation message at the first cluster of computing nodes from the network gateway, wherein the transfer initiation message is associated with the first replication job and includes an identifier of the second computing node. In such examples, transmitting the copies of the first set of one or more computing snapshots from the second computing node to the first computing node and transmitting the copies of the first set of one or more computing snapshots from the first computing node to the second cluster of computing nodes via the network gateway may occur in response to the transfer initiation message.

In some examples, prior to the first replication request, the first computing node may receive a prior replication request (identifying a third computing node) from the network gateway that is also associated with the first replication job for the first cluster of computing nodes to provide the copies of the first set of one or more computing snapshots to the second cluster of computing nodes. The first cluster of computing nodes may then determine that the third computing node is unavailable to service the first replication job. The first computing node may transmit (e.g., to the second cluster via the network gateway) an indication that the third computing node is unavailable to service the first replication job, where the first replication request identifies the second computing node based on the indication that the third computing node is unavailable to service the first replication job.

In some examples, the first computing node may receive a third replication request from the network gateway associated with a third replication job for the first cluster of computing nodes to provide copies of a third set of one or more computing snapshots to the second cluster of computing nodes. The first cluster of computing nodes then may determine that the first computing node is to service the third replication job associated with the third replication request. The network bandwidth allocation may then be increased for the first computing node based on the third replication request being received at the first computing node from the network gateway.

In some implementations, an incremental bandwidth factor for the first cluster may be based on dividing an amount of network bandwidth headroom for the first cluster by a quantity of replication requests that are pending at the first cluster. The network bandwidth allocation for the computing node is then based on multiplying the incremental bandwidth factor by the respective network throttle value for the computing node. In some examples, each computing node of the first cluster of computing nodes is associated with a minimum or threshold amount of respective network bandwidth, where a minimum amount of network bandwidth for the first cluster is based on multiplying the minimum amount of respective network bandwidth for each computing node by a quantity of computing nodes included in the first cluster, and the amount of network bandwidth headroom for the first cluster is based on a difference between a network bandwidth limit for the first cluster and the minimum amount of network bandwidth for the first cluster.

At 420, the first replication job may be serviced at the second computing node by obtaining the copies of the first set of one or more computing snapshots, transmitting the copies of the first set of one or more computing snapshots from the second computing node to the first computing node, and then transmitting the copies of the first set of one or more computing snapshots to the second cluster of computing nodes via the network gateway. In some examples, the copies of the first set of one or more computing snapshots are transmitted from the second computing node to the first computing node and transmitted from the first computing node to the second cluster of computing nodes via the network gateway as part of a data transfer procedure.

Figure 5:
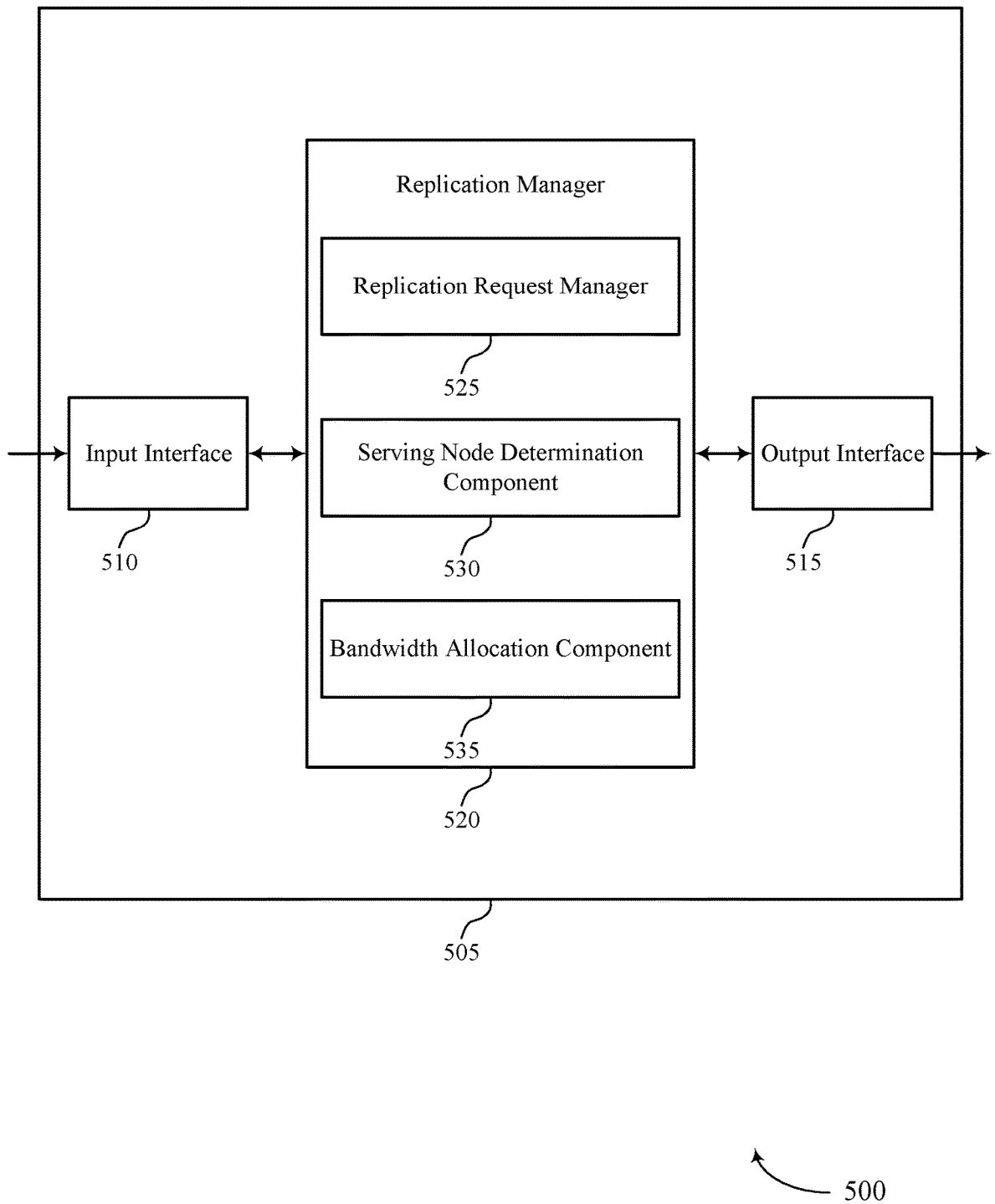
FIG. 5 illustrates a block diagram of an apparatus that supports bandwidth management for a cluster of storage nodes in accordance with aspects of the present disclosure.

FIG. 5 illustrates a block diagram 500 of a system 505 that supports bandwidth management for a cluster of storage nodes in accordance with aspects of the present disclosure. In some examples, the system 505 may be an example of aspects of one or more components described with reference to FIG. 1, such as a DMS 110. The system 505 may include an input interface 510, an output interface 515, and a replication manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the replication manager 520 to support bandwidth management for a cluster of storage nodes. In some cases, the input interface 510 may be a component of a network interface 725 as described with reference to FIG. 7.

The output interface 515 may manage output signaling for the system 505. For example, the output interface 515 may receive signaling from other components of the system 505, such as the replication manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the replication manager 520 may include a replication request manager 525, a serving node determination component 530, a bandwidth allocation component 535, or any combination thereof. In some examples, the replication manager 520, or various components thereof, may be configured to perform various operations (e.g., receiving, monitoring, transmitting) using or otherwise in cooperation with the input interface 510, the output interface 515, or both. For example, the replication manager 520 may receive information from the input interface 510, send information to the output interface 515, or be integrated in combination with the input interface 510, the output interface 515, or both to receive information, transmit information, or perform various other operations as described herein.

The replication manager 520 may support managing a first cluster of computing nodes in accordance with examples as disclosed herein. The replication request manager 525 may be configured as or otherwise support a means for receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes. The serving node determination component 530 may be configured as or otherwise support a means for determining, at the first cluster of computing nodes, that a second computing node of the first cluster of computing nodes is to service the first replication job associated with the first replication request that was received at the first computing node. The bandwidth allocation component 535 may be configured as or otherwise support a means for increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

Figure 6:
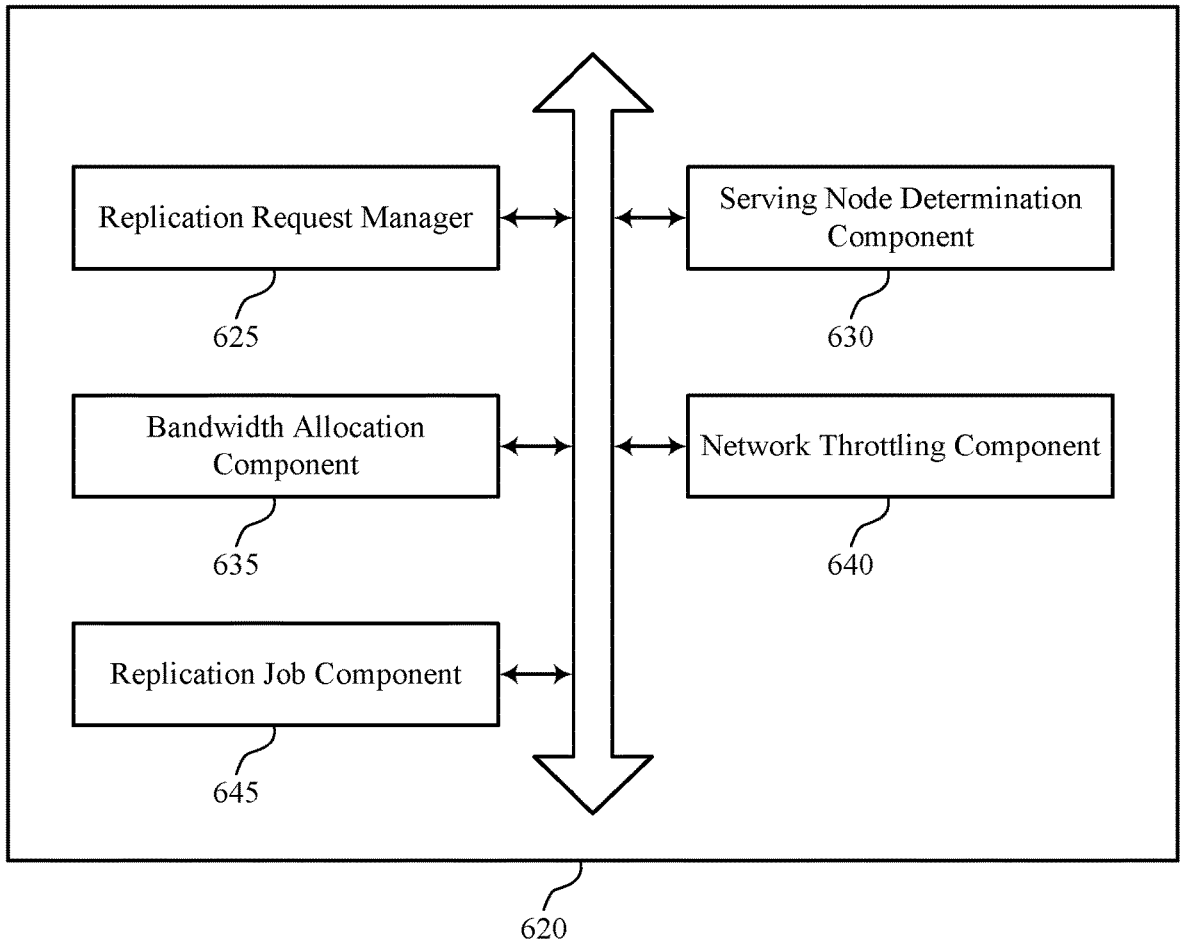
FIG. 6 illustrates a block diagram of a replication manager that supports bandwidth management for a cluster of storage nodes in accordance with aspects of the present disclosure.

FIG. 6 illustrates a block diagram 600 of a replication manager 620 that supports bandwidth management for a cluster of storage nodes in accordance with aspects of the present disclosure. The replication manager 620 may be an example of aspects of a replication manager or a replication manager 520, or both, as described herein. The replication manager 620, or various components thereof, may be an example of means for performing various aspects of bandwidth management for a cluster of storage nodes as described herein. For example, the replication manager 620 may include a replication request manager 625, a serving node determination component 630, a bandwidth allocation component 635, a network throttling component 640), a replication job component 645, or any combination thereof. Each of these components may communicate, directly or indirectly, with one another (e.g., via one or more buses, communications links, communications interfaces, or any combination thereof).

The replication manager 620 may support managing a first cluster of computing nodes in accordance with examples as disclosed herein. The replication request manager 625 may be configured as or otherwise support a means for receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes. The serving node determination component 630 may be configured as or otherwise support a means for determining, at the first cluster of computing nodes, that a second computing node of the first cluster of computing nodes is to service the first replication job associated with the first replication request that was received at the first computing node. The bandwidth allocation component 635 may be configured as or otherwise support a means for increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

In some examples, the replication request manager 625 may be configured as or otherwise support a means for receiving, at the second computing node of the first cluster of computing nodes, a second replication request from the network gateway, the second replication request associated with a second replication job for the first cluster of computing nodes to provide copies of a second set of one or more computing snapshots to the second cluster of computing nodes. In some examples, the bandwidth allocation component 635 may be configured as or otherwise support a means for increasing the network bandwidth allocation for the second computing node based on the second replication request being received at the second computing node from the network gateway.

In some examples, the replication request manager 625 may be configured as or otherwise support a means for receiving, at the first computing node of the first cluster of computing nodes, a third replication request from the network gateway, the third replication request associated with a third replication job for the first cluster of computing nodes to provide copies of a third set of one or more computing snapshots to the second cluster of computing nodes. In some examples, the serving node determination component 630 may be configured as or otherwise support a means for determining, at the first cluster of computing nodes, that the first computing node is to service the third replication job associated with the third replication request that was received at the first computing node. In some examples, the bandwidth allocation component 635 may be configured as or otherwise support a means for increasing the network bandwidth allocation for the first computing node based on the third replication request being received at the first computing node from the network gateway.

In some examples, the network throttling component 640 may be configured as or otherwise support a means for storing respective network throttle values for the computing nodes of the first cluster of computing nodes. In some examples, the respective network throttle value for a computing node is increased in response to replication requests received at the computing node from the network gateway. In some examples, the respective network throttle value for the computing node is decreased in response to completion of transfer sessions associated with the replication requests received at the computing node from the network gateway. In some examples, the respective network throttle value for the computing node is maintained in response to replication jobs that are serviced by the computing node but are associated with replication requests received from the network gateway at other computing nodes of the first cluster of computing nodes. In some examples, a network bandwidth allocation for the computing node is proportional to the respective network throttle value for the computing node.

In some examples, an incremental bandwidth factor for the first cluster is based on dividing an amount of network bandwidth headroom for the first cluster by a quantity of replication requests that are pending at the first cluster. In some examples, the network bandwidth allocation for the computing node is based on multiplying the incremental bandwidth factor by the respective network throttle value for the computing node.

In some examples, each computing node of the first cluster of computing nodes is associated with a minimum amount of respective network bandwidth, where a minimum amount of network bandwidth for the first cluster is based on multiplying the minimum amount of respective network bandwidth for each computing node by a quantity of computing nodes included in the first cluster. In some examples, the amount of network bandwidth headroom for the first cluster is based on a difference between a network bandwidth limit for the first cluster and the minimum amount of network bandwidth for the first cluster.

In some examples, the network throttling component 640 may be configured as or otherwise support a means for storing respective resource throttle values for the computing nodes of the first cluster of computing nodes that are based on respective quantities of pending replication jobs for service by the computing nodes. In some examples, the respective resource throttle value for a computing node is increased in response to replication jobs to be serviced by the computing node. In some examples, the respective resource throttle value for the computing node is decreased in response to the computing node completing a replication job associated with a replication request. In some examples, the respective resource throttle value for the computing node is maintained in response to replication requests that are received at the computing node from the network gateway but are associated with replication jobs serviced by other computing nodes of the first cluster of computing nodes. In some examples, a means for a network bandwidth allocation for the computing node is independent of the respective resource throttle value for the computing node.

In some examples, the replication request manager 625 may be configured as or otherwise support a means for accepting, at the second computing node, the first replication job based on a quantity of pending replication requests for service at the second computing node being below a threshold.

In some examples, to support determining that the second computing node of the first cluster of computing nodes is to service the first replication job, the serving node determination component 630 may be configured as or otherwise support a means for determining whether the second computing node is available to service the first replication job based on a quantity of active replication jobs for the second computing node being less than a threshold quantity of replication jobs.

In some examples, the first replication request identifies the second computing node. In some examples, the determination of whether the second computing node is available to service the first replication job is performed in response to the first replication request identifying the second computing node. In some examples, the method further includes transmitting, from the first computing node to the second cluster via the network gateway, an indication that the second computing node is available to service the first replication job.

In some examples, the replication request manager 625 may be configured as or otherwise support a means for receiving, at the first computing node prior to the first replication request, a prior replication request from the network gateway, the prior replication request also associated with the first replication job for the first cluster of computing nodes to provide the copies of the first set of one or more computing snapshots to the second cluster of computing nodes, where the prior replication request identifies a third computing node of the first cluster of computing nodes. In some examples, the serving node determination component 630 may be configured as or otherwise support a means for determining, at the first cluster of computing nodes, that the third computing node is unavailable to service the first replication job. In some examples, the serving node determination component 630 may be configured as or otherwise support a means for transmitting, from the first computing node to the second cluster via the network gateway, an indication that the third computing node is unavailable to service the first replication job, where the first replication request identifies the second computing node based on the indication that the third computing node is unavailable to service the first replication job.

In some examples, the replication job component 645 may be configured as or otherwise support a means for servicing the first replication job at the second computing node, where servicing the first replication job includes obtaining the copies of the first set of one or more computing snapshots. In some examples, the replication job component 645 may be configured as or otherwise support a means for transmitting the copies of the first set of one or more computing snapshots from the second computing node to the first computing node. In some examples, the replication job component 645 may be configured as or otherwise support a means for transmitting, from the first computing node, the copies of the first set of one or more computing snapshots to the second cluster of computing nodes via the network gateway.

In some examples, the serving node determination component 630 may be configured as or otherwise support a means for transmitting, to the second cluster of computing nodes via the network gateway, an indication that the second computing node is to service the first replication job. In some examples, the replication job component 645 may be configured as or otherwise support a means for receiving, after transmitting the indication that the second computing node is to service the first replication job, a transfer initiation message at the first cluster of computing nodes from the network gateway, where the transfer initiation message is associated with the first replication job and includes an identifier of the second computing node, and where transmitting the copies of the first set of one or more computing snapshots from the second computing node to the first computing node and transmitting the copies of the first set of one or more computing snapshots from the first computing node to the second cluster of computing nodes via the network gateway occur in response to the transfer initiation message.

In some examples, the first replication request is received as part of a resource registration procedure to determine which node of the first cluster of computing nodes is to service the first replication job. In some examples, the copies of the first set of one or more computing snapshots are transmitted from the second computing node to the first computing node and transmitted from the first computing node to the second cluster of computing nodes via the network gateway as part of a data transfer procedure, the data transfer procedure based on completion of the resource registration procedure.

In some examples, the bandwidth allocation component 635 may be configured as or otherwise support a means for determining the network bandwidth allocation for the first computing node and the network bandwidth allocation for the second computing node based on a background job associated with the first cluster of computing nodes.

In some examples, the serving node determination component 630 may be configured as or otherwise support a means for evaluating whether the second computing node is available to service the first replication job based on a random selection of the second computing node, where the second computing node and other nodes of the first cluster of computing nodes are equally likely to be selected via the random selection.

In some examples, the network bandwidth allocation for the first computing node and the network bandwidth allocation for the second computing node are applicable to traffic from the first computing node to the network gateway and from the second computing node to the network gateway respectively. In some examples, the network bandwidth allocation for the first computing node and the network bandwidth allocation for the second computing node are inapplicable to traffic between nodes of the first cluster of computing nodes.

Figure 7:
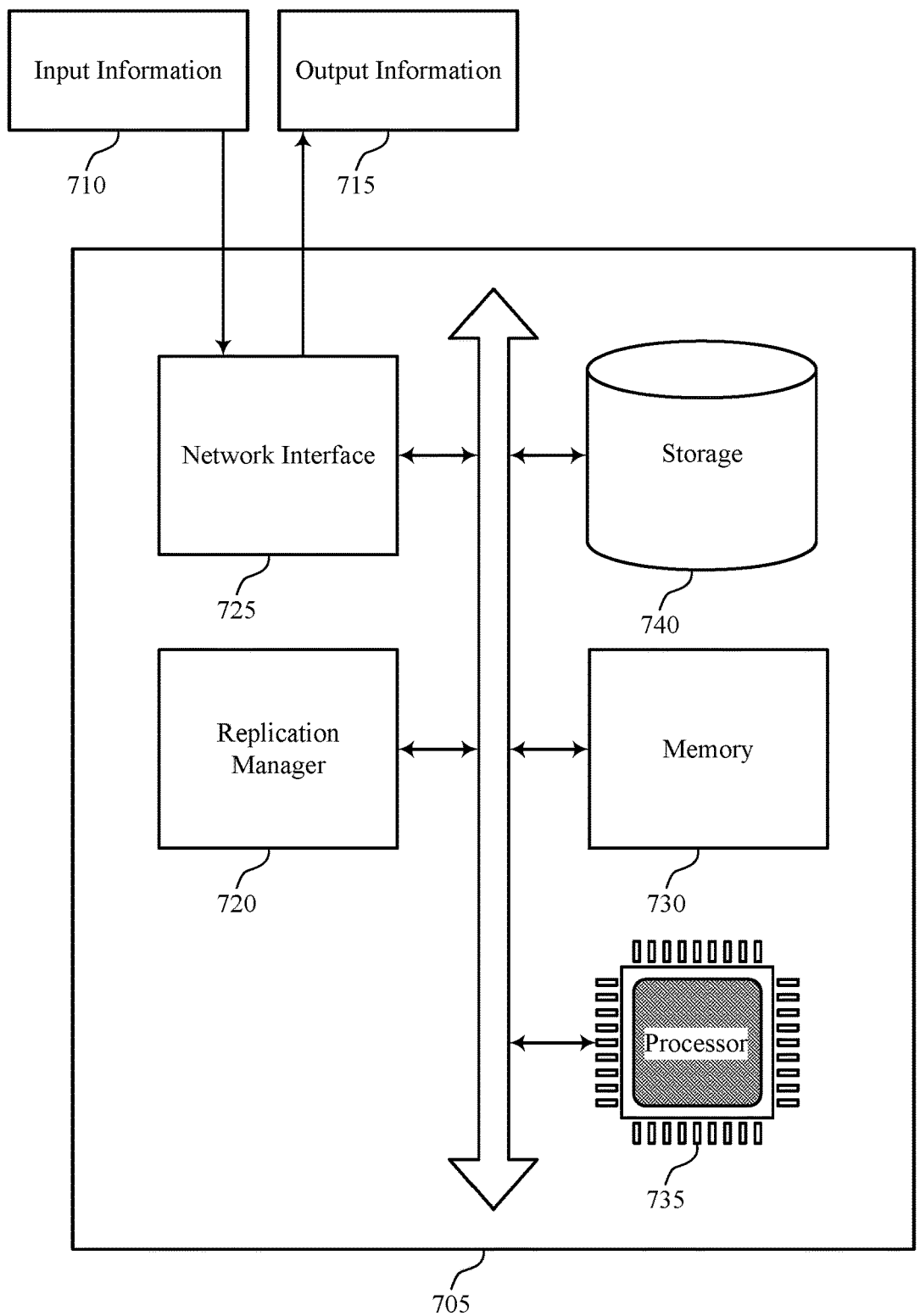
FIG. 7 illustrates a diagram of a system including a device that supports bandwidth management for a cluster of storage nodes in accordance with aspects of the present disclosure.

FIG. 7 illustrates a block diagram 700 of a system 705 that supports bandwidth management for a cluster of storage nodes in accordance with aspects of the present disclosure. The system 705 may be an example of or include the components of a system 505 as described herein. The system 705 may include components for data management, including components such as a replication manager 720, an input information 710, an output information 715, a network interface 725, a memory 730, a processor 735, and a storage 740. These components may be in electronic communication or otherwise coupled with each other (e.g., operatively, communicatively, functionally, electronically, electrically: via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting bandwidth management for a cluster of storage nodes). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

The replication manager 720 may support managing a first cluster of computing nodes in accordance with examples as disclosed herein. For example, the replication manager 720 may be configured as or otherwise support a means for receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes. The replication manager 720 may be configured as or otherwise support a means for determining, at the first cluster of computing nodes, that a second computing node of the first cluster of computing nodes is to service the first replication job associated with the first replication request that was received at the first computing node. The replication manager 720 may be configured as or otherwise support a means for increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

By including or configuring the replication manager 720 in accordance with examples as described herein, the system 705 may support techniques for bandwidth management for a cluster of storage nodes, which may provide one or more benefits such as, for example, more efficient utilization of computing resources, more efficient use of network resources, or both, improved scalability, improved security and storage of data, improved network bandwidth saturation, increased bandwidth usage and allocation, increased data replication efficiency, among other improvements.

Figure 8:
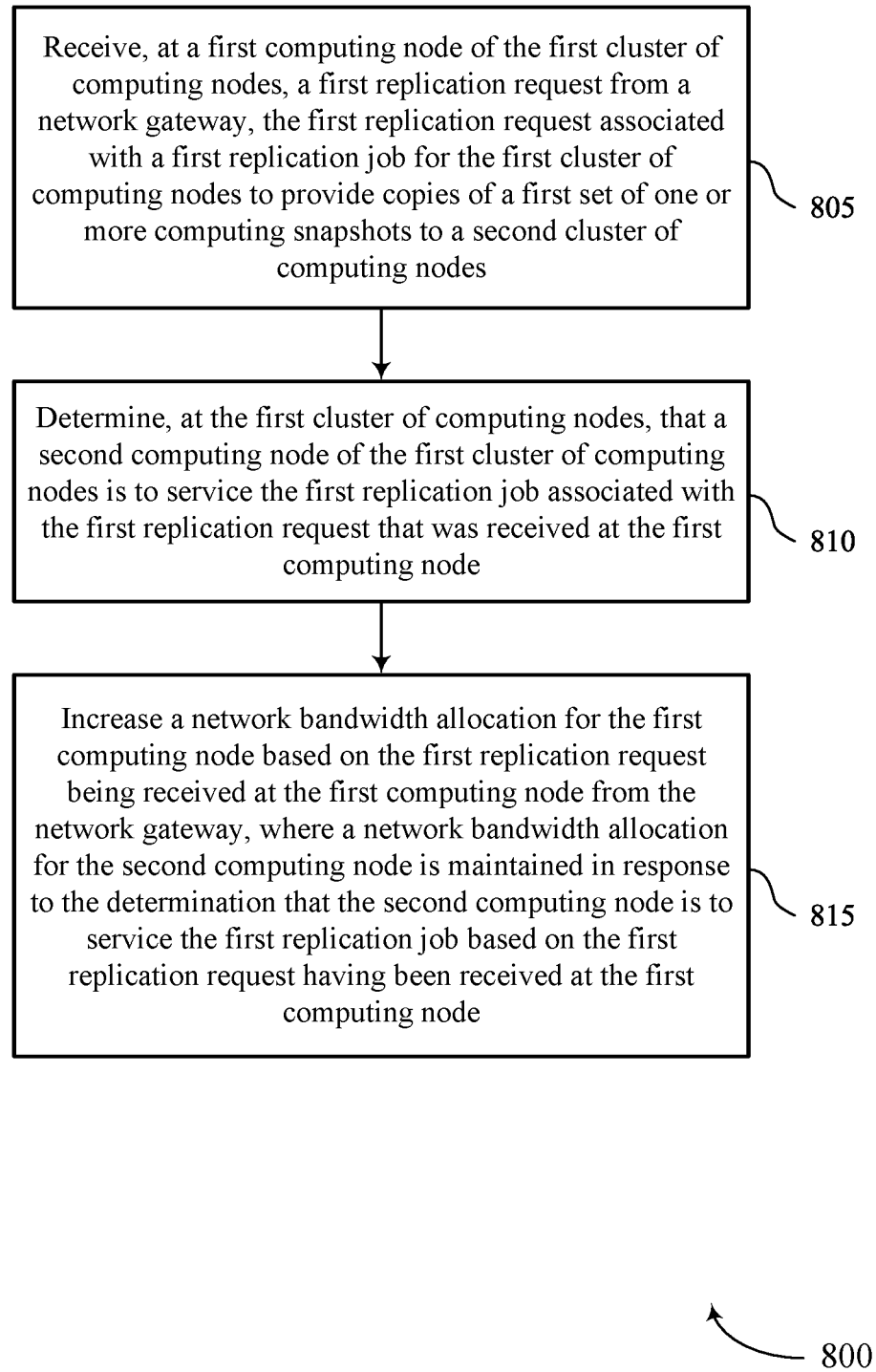
FIGS. 8 and 9 illustrate flowcharts showing methods that support bandwidth management for a cluster of storage nodes in accordance with aspects of the present disclosure.

FIG. 8 illustrates a flowchart showing a method 800 that supports bandwidth management for a cluster of storage nodes in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes. The operations of 805 may be performed in accordance with examples as disclosed herein. In some examples, aspects of the operations of 805 may be performed by a replication request manager 625 as described with reference to FIG. 6.

At 810, the method may include determining, at the first cluster of computing nodes, that a second computing node of the first cluster of computing nodes is to service the first replication job associated with the first replication request that was received at the first computing node. The operations of 810 may be performed in accordance with examples as disclosed herein. In some examples, aspects of the operations of 810) may be performed by a serving node determination component 630 as described with reference to FIG. 6.

At 815, the method may include increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node. The operations of 815 may be performed in accordance with examples as disclosed herein. In some examples, aspects of the operations of 815 may be performed by a bandwidth allocation component 635 as described with reference to FIG. 6.

Figure 9:
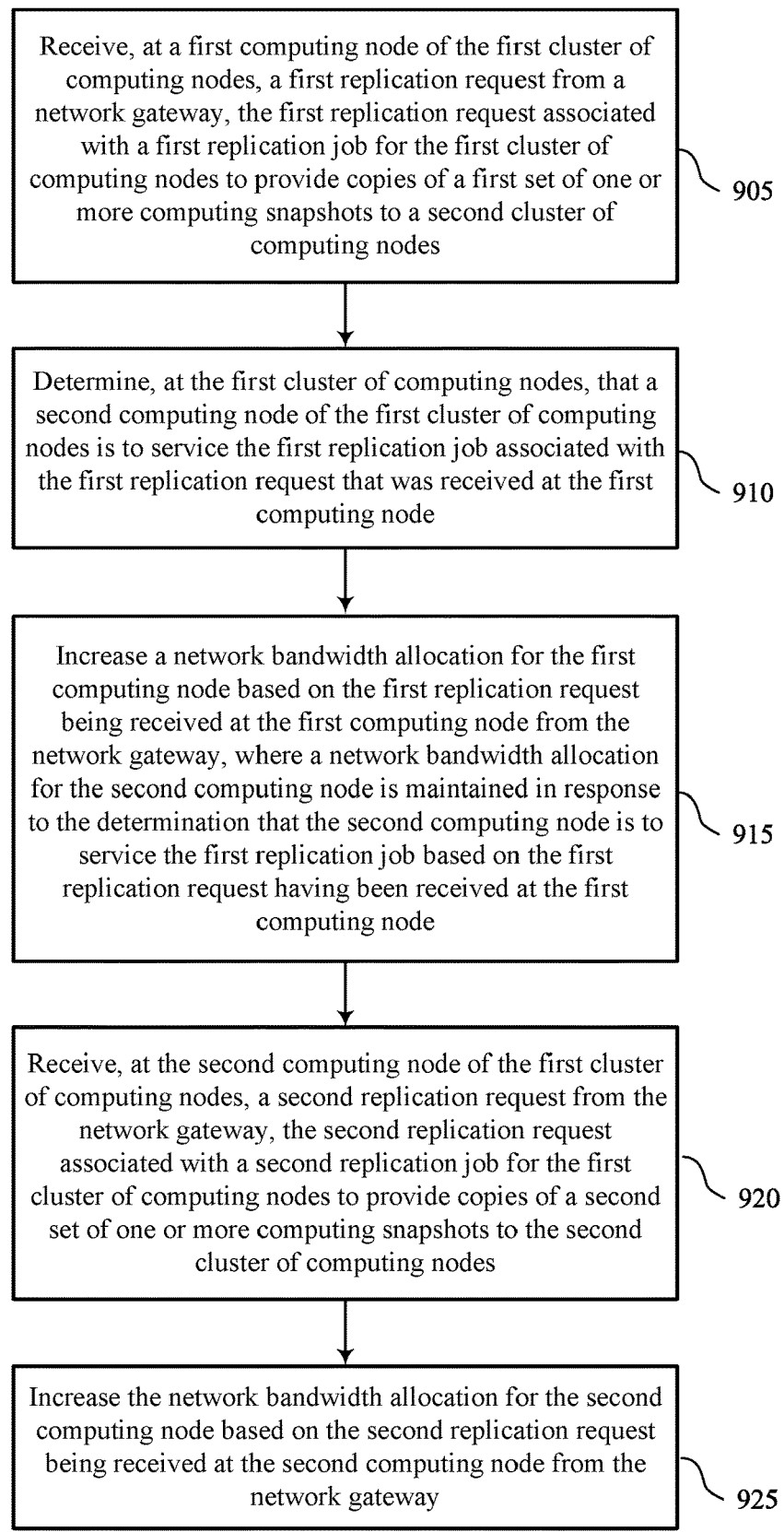

FIG. 9 illustrates a flowchart showing a method 900 that supports bandwidth management for a cluster of storage nodes in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes. The operations of 905 may be performed in accordance with examples as disclosed herein. In some examples, aspects of the operations of 905 may be performed by a replication request manager 625 as described with reference to FIG. 6.

At 910, the method may include determining, at the first cluster of computing nodes, that a second computing node of the first cluster of computing nodes is to service the first replication job associated with the first replication request that was received at the first computing node. The operations of 910 may be performed in accordance with examples as disclosed herein. In some examples, aspects of the operations of 910 may be performed by a serving node determination component 630 as described with reference to FIG. 6.

At 915, the method may include increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node. The operations of 915 may be performed in accordance with examples as disclosed herein. In some examples, aspects of the operations of 915 may be performed by a bandwidth allocation component 635 as described with reference to FIG. 6.

At 920, the method may include receiving, at the second computing node of the first cluster of computing nodes, a second replication request from the network gateway, the second replication request associated with a second replication job for the first cluster of computing nodes to provide copies of a second set of one or more computing snapshots to the second cluster of computing nodes. The operations of 920 may be performed in accordance with examples as disclosed herein. In some examples, aspects of the operations of 920 may be performed by a replication request manager 625 as described with reference to FIG. 6.

At 925, the method may include increasing the network bandwidth allocation for the second computing node based on the second replication request being received at the second computing node from the network gateway. The operations of 925 may be performed in accordance with examples as disclosed herein. In some examples, aspects of the operations of 925 may be performed by a bandwidth allocation component 635 as described with reference to FIG. 6.

A method for managing a first cluster of computing nodes is described. The method may include receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes, determining, at the first cluster of computing nodes, that a second computing node of the first cluster of computing nodes is to service the first replication job associated with the first replication request that was received at the first computing node, and increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

An apparatus for managing a first cluster of computing nodes is described. The apparatus may include a processor, memory coupled with the processor, and instructions stored in the memory. The instructions may be executable by the processor to cause the apparatus to receive, at a first computing node of the first cluster of computing nodes, a first replication request from a network gateway, the first replication request associated with a first replication job for the first cluster of computing nodes to provide copies of a first set of one or more computing snapshots to a second cluster of computing nodes, determine, at the first cluster of computing nodes, that a second computing node of the first cluster of computing nodes is to service the first replication job associated with the first replication request that was received at the first computing node, and increase a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

Another apparatus for managing a first cluster of computing nodes is described. The apparatus may include means for receiving, at a first computing node of the first cluster of computing nodes, a first replication request from a network gateway, the first replication request associated with a first replication job for the first cluster of computing nodes to provide copies of a first set of one or more computing snapshots to a second cluster of computing nodes, means for determining, at the first cluster of computing nodes, that a second computing node of the first cluster of computing nodes is to service the first replication job associated with the first replication request that was received at the first computing node, and means for increasing a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

A non-transitory computer-readable medium storing code for managing a first cluster of computing nodes is described. The code may include instructions executable by a processor to receive, at a first computing node of the first cluster of computing nodes, a first replication request from a network gateway, the first replication request associated with a first replication job for the first cluster of computing nodes to provide copies of a first set of one or more computing snapshots to a second cluster of computing nodes, determine, at the first cluster of computing nodes, that a second computing node of the first cluster of computing nodes is to service the first replication job associated with the first replication request that was received at the first computing node, and increase a network bandwidth allocation for the first computing node based on the first replication request being received at the first computing node from the network gateway, where a network bandwidth allocation for the second computing node is maintained in response to the determination that the second computing node is to service the first replication job based on the first replication request having been received at the first computing node.

Some examples of the method, apparatuses, and non-transitory computer-readable medium described herein may further include operations, features, means, or instructions for receiving, at the second computing node of the first cluster of computing nodes, a second replication request from the network gateway, the second replication request associated with a second replication job for the first cluster of computing nodes to provide copies of a second set of one or more computing snapshots to the second cluster of computing nodes and increasing the network bandwidth allocation for the second computing node based on the second replication request being received at the second computing node from the network gateway.

Some examples of the method, apparatuses, and non-transitory computer-readable medium described herein may further include operations, features, means, or instructions for receiving, at the first computing node of the first cluster of computing nodes, a third replication request from the network gateway, the third replication request associated with a third replication job for the first cluster of computing nodes to provide copies of a third set of one or more computing snapshots to the second cluster of computing nodes, determining, at the first cluster of computing nodes, that the first computing node may be to service the third replication job associated with the third replication request that was received at the first computing node, and increasing the network bandwidth allocation for the first computing node based on the third replication request being received at the first computing node from the network gateway.

Some examples of the method, apparatuses, and non-transitory computer-readable medium described herein may further include operations, features, means, or instructions for storing respective network throttle values for the computing nodes of the first cluster of computing nodes, where, the respective network throttle value for a computing node may be increased in response to replication requests received at the computing node from the network gateway, the respective network throttle value for the computing node may be decreased in response to completion of transfer sessions associated with the replication requests received at the computing node from the network gateway, the respective network throttle value for the computing node may be maintained in response to replication jobs that may be serviced by the computing node but may be associated with replication requests received from the network gateway at other computing nodes of the first cluster of computing nodes, and a network bandwidth allocation for the computing node may be proportional to the respective network throttle value for the computing node.

In some examples of the method, apparatuses, and non-transitory computer-readable medium described herein, an incremental bandwidth factor for the first cluster may be based on dividing an amount of network bandwidth headroom for the first cluster by a quantity of replication requests that may be pending at the first cluster and the network bandwidth allocation for the computing node may be based on multiplying the incremental bandwidth factor by the respective network throttle value for the computing node.

In some examples of the method, apparatuses, and non-transitory computer-readable medium described herein, each computing node of the first cluster of computing nodes may be associated with a minimum amount of respective network bandwidth, where a minimum amount of network bandwidth for the first cluster may be based on multiplying the minimum amount of respective network bandwidth for each computing node by a quantity of computing nodes included in the first cluster and the amount of network bandwidth headroom for the first cluster may be based on a difference between a network bandwidth limit for the first cluster and the minimum amount of network bandwidth for the first cluster.

Some examples of the method, apparatuses, and non-transitory computer-readable medium described herein may further include operations, features, means, or instructions for storing respective resource throttle values for the computing nodes of the first cluster of computing nodes that may be based on respective quantities of pending replication jobs for service by the computing nodes, where, the respective resource throttle value for a computing node may be increased in response to replication jobs to be serviced by the computing node, the respective resource throttle value for the computing node may be decreased in response to the computing node completing a replication job associated with a replication request, the respective resource throttle value for the computing node may be maintained in response to replication requests that may be received at the computing node from the network gateway but may be associated with replication jobs serviced by other computing nodes of the first cluster of computing nodes, and a network bandwidth allocation for the computing node may be independent of the respective resource throttle value for the computing node.

Some examples of the method, apparatuses, and non-transitory computer-readable medium described herein may further include operations, features, means, or instructions for accepting, at the second computing node, the first replication job based on a quantity of pending replication requests for service at the second computing node being below a threshold.

In some examples of the method, apparatuses, and non-transitory computer-readable medium described herein, determining that the second computing node of the first cluster of computing nodes may be to service the first replication job may include operations, features, means, or instructions for determining whether the second computing node is available to service the first replication job based on a quantity of active replication jobs for the second computing node being less than a threshold quantity of replication jobs.

In some examples of the method, apparatuses, and non-transitory computer-readable medium described herein, the first replication request identifies the second computing node, the determination that the second computing node may be available to service the first replication job may be performed in response to the first replication request identifying the second computing node, and the method further includes transmitting, from the first computing node to the second cluster via the network gateway, an indication that the second computing node may be available to service the first replication job.

Some examples of the method, apparatuses, and non-transitory computer-readable medium described herein may further include operations, features, means, or instructions for receiving, at the first computing node prior to the first replication request, a prior replication request from the network gateway, the prior replication request also associated with the first replication job for the first cluster of computing nodes to provide the copies of the first set of one or more computing snapshots to the second cluster of computing nodes, where the prior replication request identifies a third computing node of the first cluster of computing nodes, determining, at the first cluster of computing nodes, that the third computing node may be unavailable to service the first replication job, and transmitting, from the first computing node to the second cluster via the network gateway, an indication that the third computing node may be unavailable to service the first replication job, where the first replication request identifies the second computing node based on the indication that the third computing node may be unavailable to service the first replication job.

Some examples of the method, apparatuses, and non-transitory computer-readable medium described herein may further include operations, features, means, or instructions for servicing the first replication job at the second computing node, where servicing the first replication job includes obtaining the copies of the first set of one or more computing snapshots, transmitting the copies of the first set of one or more computing snapshots from the second computing node to the first computing node, and transmitting, from the first computing node, the copies of the first set of one or more computing snapshots to the second cluster of computing nodes via the network gateway.

Some examples of the method, apparatuses, and non-transitory computer-readable medium described herein may further include operations, features, means, or instructions for transmitting, to the second cluster of computing nodes via the network gateway, an indication that the second computing node may be to service the first replication job and receiving, after transmitting the indication that the second computing node may be to service the first replication job, a transfer initiation message at the first cluster of computing nodes from the network gateway, where the transfer initiation message may be associated with the first replication job and includes an identifier of the second computing node, and where transmitting the copies of the first set of one or more computing snapshots from the second computing node to the first computing node and transmitting the copies of the first set of one or more computing snapshots from the first computing node to the second cluster of computing nodes via the network gateway occur in response to the transfer initiation message.

In some examples of the method, apparatuses, and non-transitory computer-readable medium described herein, the first replication request may be received as part of a resource registration procedure to determine which node of the first cluster of computing nodes may be to service the first replication job and the copies of the first set of one or more computing snapshots may be transmitted from the second computing node to the first computing node and transmitted from the first computing node to the second cluster of computing nodes via the network gateway as part of a data transfer procedure, the data transfer procedure based on completion of the resource registration procedure.

Some examples of the method, apparatuses, and non-transitory computer-readable medium described herein may further include operations, features, means, or instructions for determining the network bandwidth allocation for the first computing node and the network bandwidth allocation for the second computing node based on a background job associated with the first cluster of computing nodes.

Some examples of the method, apparatuses, and non-transitory computer-readable medium described herein may further include operations, features, means, or instructions for evaluating whether the second computing node may be available to service the first replication job based on a random selection of the second computing node, where the second computing node and other nodes of the first cluster of computing nodes may be equally likely to be selected via the random selection.

In some examples of the method, apparatuses, and non-transitory computer-readable medium described herein, the network bandwidth allocation for the first computing node and the network bandwidth allocation for the second computing node may be applicable to traffic from the first computing node to the network gateway and from the second computing node to the network gateway respectively and the network bandwidth allocation for the first computing node and the network bandwidth allocation for the second computing node may be inapplicable to traffic between nodes of the first cluster of computing nodes.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, at a first computing node of a first cluster of computing nodes, a first replication request from a network gateway, wherein the first replication request is addressed to a first port of the network gateway, wherein the first computing node is mapped to the first port of the network gateway, and wherein the first replication request is associated with a first replication job for the first cluster of computing nodes to provide copies of a first set of one or more computing snapshots to a second cluster of computing nodes;

determining, at the first cluster of computing nodes, that the first computing node is to act as a redirecting node for the first replication request and a second computing node of the first cluster of computing nodes is to act as a worker node for the first replication request, wherein determining that the first computing node is to act as the redirecting node and the second computing node is to act as the worker node for the first replication request comprises determining that the second computing node is to service the first replication job associated with the first replication request that was received at the first computing node; and increasing a first network bandwidth allocation for the first computing node based at least in part on the first replication request being received at the first computing node from the network gateway in accordance with the first computing node being mapped to the first port of the network gateway, wherein the increase of the first network bandwidth allocation is for communication, once the first computing node has obtained the copies of the first set of one or more computing snapshots from the second computing node upon completion of the servicing by the second computing node, of the copies of the first set of one or more computing snapshots to the network gateway by the first computing node via the first port of the network gateway, wherein a second network bandwidth allocation for the second computing node is maintained in response to the determination that the second computing node is to service the first replication job based at least in part on the first replication request having been received at the second computing node as an internal redirect of the first replication request from the first computing node to the second computing node within the first cluster of computing nodes.

2. The method of claim 1, further comprising:

receiving, at the second computing node of the first cluster of computing nodes, a second replication request from the network gateway, wherein the second replication request is addressed to a second port of the network gateway, wherein the second computing node is mapped to the second port of the network gateway, and wherein the second replication request is associated with a second replication job for the first cluster of computing nodes to provide copies of a second set of one or more computing snapshots to the second cluster of computing nodes; and increasing the second network bandwidth allocation for the second computing node based at least in part on the second replication request being received at the second computing node from the network gateway in accordance with the second computing node being mapped to the second port of the network gateway.

3. The method of claim 1, further comprising:
receiving, at the first computing node of the first cluster of computing nodes, a third replication request from the network gateway, wherein the third replication request is addressed to the first port of the network gateway, and wherein the third replication request is associated with a third replication job for the first cluster of computing nodes to provide copies of a third set of one or more computing snapshots to the second cluster of computing nodes;
determining, at the first cluster of computing nodes, that the first computing node is to act as a worker node for the third replication request, wherein determining that the first computing node is to act as the worker node for the third replication request comprises determining that the first computing node is to service the third replication job associated with the third replication request that was received at the first computing node; and
increasing the first network bandwidth allocation for the first computing node based at least in part on the third replication request being received at the first computing node from the network gateway in accordance with the first computing node being mapped to the first port of the network gateway.

4. The method of claim 1, further comprising:
storing respective network throttle values for computing nodes of the first cluster of computing nodes, wherein:
 a respective network throttle value for a computing node is increased in response to replication requests received at the computing node from the network gateway;
 the respective network throttle value for the computing node is decreased in response to completion of transfer sessions associated with the replication requests received at the computing node from the network gateway;
 the respective network throttle value for the computing node is maintained in response to replication jobs that are serviced by the computing node but are associated with replication requests received from the network gateway at other computing nodes of the first cluster of computing nodes; and
 a respective network bandwidth allocation for the computing node is proportional to the respective network throttle value for the computing node.

5. The method of claim 4, wherein:
an incremental bandwidth factor for the first cluster of computing nodes is based at least in part on dividing an amount of network bandwidth headroom for the first cluster of computing nodes by a quantity of replication requests that are pending at the first cluster of computing nodes; and
the respective network bandwidth allocation for the computing node is based at least in part on multiplying the incremental bandwidth factor by the respective network throttle value for the computing node.

6. The method of claim 5, wherein:
each computing node of the first cluster of computing nodes is associated with a minimum amount of respective network bandwidth, wherein a minimum amount of network bandwidth for the first cluster of computing nodes is based at least in part on multiplying the minimum amount of respective network bandwidth for each computing node by a quantity of computing nodes included in the first cluster of computing nodes; and
the amount of network bandwidth headroom for the first cluster of computing nodes is based at least in part on a difference between a network bandwidth limit for the first cluster of computing nodes and the minimum amount of network bandwidth for the first cluster of computing nodes.

7. The method of claim 1, further comprising:
storing respective resource throttle values for computing nodes of the first cluster of computing nodes that are based at least in part on respective quantities of pending replication jobs for service by the first cluster of computing nodes, wherein:
 a respective resource throttle value for a computing node is increased in response to replication jobs to be serviced by the computing node;
 the respective resource throttle value for the computing node is decreased in response to the computing node completing a replication job associated with a replication request;
 the respective resource throttle value for the computing node is maintained in response to replication requests that are received at the computing node from the network gateway but are associated with replication jobs serviced by other computing nodes of the first cluster of computing nodes; and
 a respective network bandwidth allocation for the computing node is independent of the respective resource throttle value for the computing node.

8. The method of claim 1, further comprising:
accepting, at the second computing node, the first replication job based at least in part on a quantity of pending replication requests for service at the second computing node being below a threshold.

9. The method of claim 1, wherein determining that the second computing node of the first cluster of computing nodes is to service the first replication job comprises:
determining that the second computing node is available to service the first replication job based at least in part on a quantity of active replication jobs for the second computing node being less than a threshold quantity of replication jobs.

10. The method of claim 9, wherein:
the first replication request identifies the second computing node;
the determination that the second computing node is available to service the first replication job is performed in response to the first replication request identifying the second computing node; and
the method further comprises transmitting, from the first computing node to the second cluster of computing nodes via the network gateway, an indication that the second computing node is available to service the first replication job.

11. The method of claim 9, further comprising:
receiving, at the first computing node prior to the first replication request, a prior replication request from the network gateway, the prior replication request also associated with the first replication job for the first cluster of computing nodes to provide the copies of the first set of one or more computing snapshots to the second cluster of computing nodes, wherein the prior replication request identifies a third computing node of the first cluster of computing nodes;
determining, at the first cluster of computing nodes, that the third computing node is unavailable to service the first replication job; and
transmitting, from the first computing node to the second cluster of computing nodes via the network gateway, an indication that the third computing node is unavailable to service the first replication job, wherein the first replication request identifies the second computing node based at least in part on the indication that the third computing node is unavailable to service the first replication job.

12. The method of claim 1, further comprising:
servicing the first replication job at the second computing node, wherein servicing the first replication job at the second computing node comprises the second computing node obtaining the copies of the first set of one or more computing snapshots;
transmitting, by the second computing node based at least in part on the second computing node acting as the worker node for the first replication job, the copies of the first set of one or more computing snapshots from the second computing node to the first computing node; and
relaying, by the first computing node based at least in part on the first computing node acting as the redirecting node for the first replication job, the copies of the first set of one or more computing snapshots from the second computing node to the second cluster of computing nodes via the first port of the network gateway, wherein the communication of the copies of the first set of one or more computing snapshots to the network gateway by the first computing node comprises the relaying by the first computing node.

13. The method of claim 12, further comprising:
transmitting, to the second cluster of computing nodes via the network gateway, an indication that the second computing node is to service the first replication job; and
receiving, after transmitting the indication that the second computing node is to service the first replication job, a transfer initiation message at the first cluster of computing nodes from the network gateway, wherein the transfer initiation message is associated with the first replication job and includes an identifier of the second computing node, and wherein transmitting the copies of the first set of one or more computing snapshots from the second computing node to the first computing node and relaying the copies of the first set of one or more computing snapshots from the first computing node to the second cluster of computing nodes via the network gateway occur in response to the transfer initiation message.

14. The method of claim 12, wherein:
the first replication request is received as part of a resource registration procedure to determine which computing node of the first cluster of computing nodes is to service the first replication job; and
the copies of the first set of one or more computing snapshots are transmitted from the second computing node to the first computing node and relayed from the first computing node to the second cluster of computing nodes via the network gateway as part of a data transfer procedure, the data transfer procedure based at least in part on completion of the resource registration procedure.

15. The method of claim 1, further comprising:
determining the first network bandwidth allocation for the first computing node and the second network bandwidth allocation for the second computing node based at least in part on a background job associated with the first cluster of computing nodes.

16. The method of claim 1, further comprising:
evaluating whether the second computing node is available to service the first replication job based at least in part on a random selection of the second computing node, wherein the second computing node and other computing nodes of the first cluster of computing nodes are equally likely to be selected via the random selection.

17. The method of claim 1, wherein:
the first network bandwidth allocation for the first computing node and the second network bandwidth allocation for the second computing node are applicable to traffic from the first computing node to the network gateway and from the second computing node to the network gateway respectively; and
the first network bandwidth allocation for the first computing node and the second network bandwidth allocation for the second computing node are inapplicable to traffic between computing nodes of the first cluster of computing nodes.

18. An apparatus, comprising:
one or more processors;
one or more memories coupled with the one or more processors; and
instructions stored in the one or more memories that, when executed by the one or more processors, cause the apparatus to:
receive, at a first computing node of a first cluster of computing nodes, a first replication request from a network gateway, wherein the first replication request is addressed to a first port of the network gateway, wherein the first computing node is mapped to the first port of the network gateway, and wherein the first replication request is associated with a first replication job for the first cluster of computing nodes to provide copies of a first set of one or more computing snapshots to a second cluster of computing nodes;
determine, at the first cluster of computing nodes, that the first computing node is to act as a redirecting node for the first replication request and a second computing node of the first cluster of computing nodes is to act as a worker node for the first replication request, wherein determining that the first computing node is to act as the redirecting node and the second computing node is to act as the worker node for the first replication request comprises determining that the second computing node is to service the first replication job associated with the first replication request that was received at the first computing node;
increase a first network bandwidth allocation for the first computing node based at least in part on the first replication request being received at the first computing node from the network gateway in accordance with the first computing node being mapped to the first port of the network gateway, wherein the increase of the first network bandwidth allocation is for communication, once the first computing node has obtained the copies of the first set of one or more computing snapshots from the second computing node upon completion of the servicing by the second computing node, of the copies of the first set of one or more computing snapshots to the network gateway by the first computing node via the first port of the network gateway; and maintain a second network bandwidth allocation for the second computing node in response to the determination that the second computing node is to service the first replication job based at least in part on the first replication request having been received at the second computing node as an internal redirect of the first replication request from the first computing node to the second computing node within the first cluster of computing nodes.

19. The apparatus of claim 18, wherein the instructions, when executed by the one or more processors, further cause the apparatus to:
receive, at the second computing node of the first cluster of computing nodes, a second replication request from the network gateway, wherein the second replication request is addressed to a second port of the network gateway, wherein the second computing node is mapped to the second port of the network gateway, and wherein the second replication request is associated with a second replication job for the first cluster of computing nodes to provide copies of a second set of one or more computing snapshots to the second cluster of computing nodes; and
increase the second network bandwidth allocation for the second computing node based at least in part on the second replication request being received at the second computing node from the network gateway in accordance with the second computing node being mapped to the second port of the network gateway.

20. A non-transitory computer-readable medium storing code, the code comprising instructions that, when executed by one or more processors of a system, cause the system to:
receive, at a first computing node of a first cluster of computing nodes, a first replication request from a network gateway, wherein the first replication request is addressed to a first port of the network gateway, wherein the first computing node is mapped to the first port of the network gateway, and wherein the first replication request is associated with a first replication job for the first cluster of computing nodes to provide copies of a first set of one or more computing snapshots to a second cluster of computing nodes;
determine, at the first cluster of computing nodes, that the first computing node is to act as a redirecting node for the first replication request and a second computing node of the first cluster of computing nodes is to act as a worker node for the first replication request, wherein determining that the first computing node is to act as the redirecting node and the second computing node is to act as the worker node for the first replication request comprises determining that the second computing node is to service the first replication job associated with the first replication request that was received at the first computing node;
increase a first network bandwidth allocation for the first computing node based at least in part on the first replication request being received at the first computing node from the network gateway in accordance with the first computing node being mapped to the first port of the network gateway, wherein the increase of the first network bandwidth allocation is for communication, once the first computing node has obtained the copies of the first set of one or more computing snapshots from the second computing node upon completion of the servicing by the second computing node, of the copies of the first set of one or more computing snapshots to the network gateway by the first computing node via the first port of the network gateway; and
maintain a second network bandwidth allocation for the second computing node in response to the determination that the second computing node is to service the first replication job based at least in part on the first replication request having been received at the second computing node as an internal redirect of the first replication request from the first computing node to the second computing node within the first cluster of computing nodes.

\* \* \* \* \*